United States Patent
Sun

(10) Patent No.: US 7,320,219 B2
(45) Date of Patent: Jan. 22, 2008

(54) METHOD FOR CONTROLLING AN INTERNAL COMBUSTION ENGINE USING MODEL BASED VGT/EGR CONTROL

(75) Inventor: Min Sun, Windsor (CA)

(73) Assignee: Detroit Diesel Corporation, Detroit, MI (US)

(*) Notice: Subject to any disclaimer, the term of this patent is extended or adjusted under 35 U.S.C. 154(b) by 82 days.

(21) Appl. No.: 11/372,927

(22) Filed: Mar. 10, 2006

(65) Prior Publication Data

US 2007/0209362 A1    Sep. 13, 2007

(51) Int. Cl.
F02B 33/44 (2006.01)
F02M 25/07 (2006.01)

(52) U.S. Cl. .............. 60/605.2; 60/602; 123/568.21; 123/568.11; 701/108

(58) Field of Classification Search .............. 60/605.2, 60/602; 123/568.11, 568.21; 701/108, 114
See application file for complete search history.

(56) References Cited

U.S. PATENT DOCUMENTS

| | | | |
|---|---|---|---|
| 6,035,640 A * | 3/2000 | Kolmanovsky et al. .... | 60/605.2 |
| 6,076,353 A | 6/2000 | Freudenberg et al. ...... | 60/605.2 |
| 6,134,889 A | 10/2000 | Markyvech et al. ......... | 60/602 |
| 6,305,167 B1 | 10/2001 | Weisman, II et al. ...... | 60/605.2 |
| 6,363,922 B1 * | 4/2002 | Romzek et al. ......... | 123/568.16 |
| 6,401,457 B1 * | 6/2002 | Wang et al. ............... | 60/605.2 |
| 6,408,834 B1 | 6/2002 | Brackney et al. .......... | 60/605.2 |
| 6,460,522 B1 | 10/2002 | Rimnac ..................... | 60/605.2 |
| 6,588,210 B2 * | 7/2003 | Kreso ........................ | 60/605.2 |
| 6,604,361 B2 * | 8/2003 | Buckland et al. .......... | 60/605.2 |
| 6,785,604 B2 * | 8/2004 | Jacobson ................... | 701/114 |
| 6,820,600 B1 * | 11/2004 | Sisken et al. ............. | 60/605.2 |
| 6,866,030 B1 | 3/2005 | Sun et al. .................. | 60/605.2 |
| 7,007,472 B2 * | 3/2006 | Baize et al. ................ | 60/602 |
| 7,100,375 B2 * | 9/2006 | Baize et al. ................ | 60/602 |
| 7,117,078 B1 * | 10/2006 | Gangopadhyay ............ | 701/108 |

* cited by examiner

Primary Examiner—Thai-Ba Trieu
(74) Attorney, Agent, or Firm—Brooks Kushman P.C.

(57) ABSTRACT

A method for controlling an internal combustion engine using model based control, the engine including a variable geometry turbocharger (VGT) driven in response to a VGT command signal and/or an exhaust gas recirculation (EGR) valve driven in response to an EGR valve command signal to recirculate exhaust to an engine intake manifold.

20 Claims, 8 Drawing Sheets

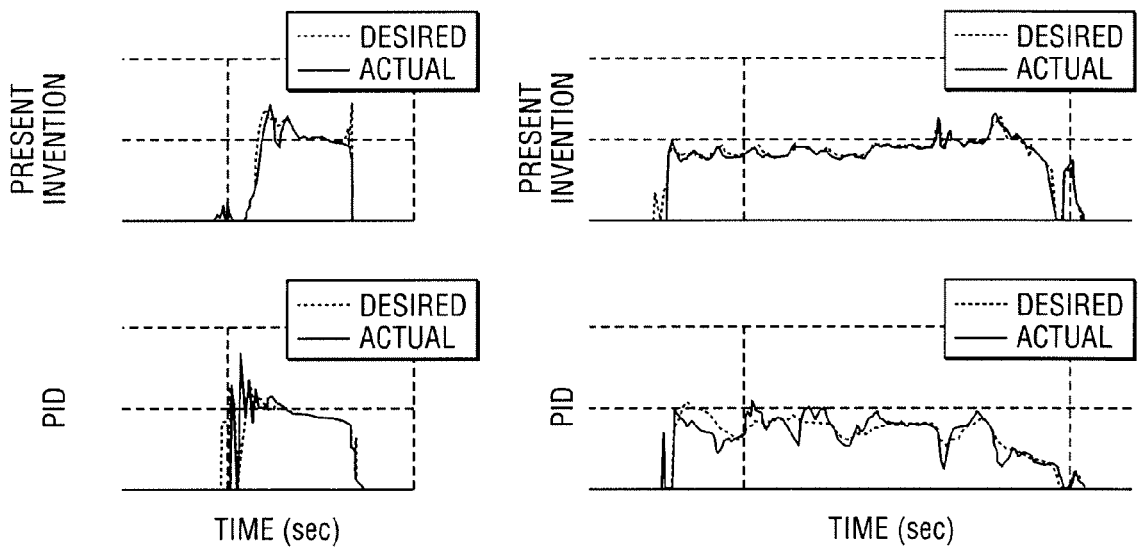
*Fig. 4a*  *Fig. 4b*
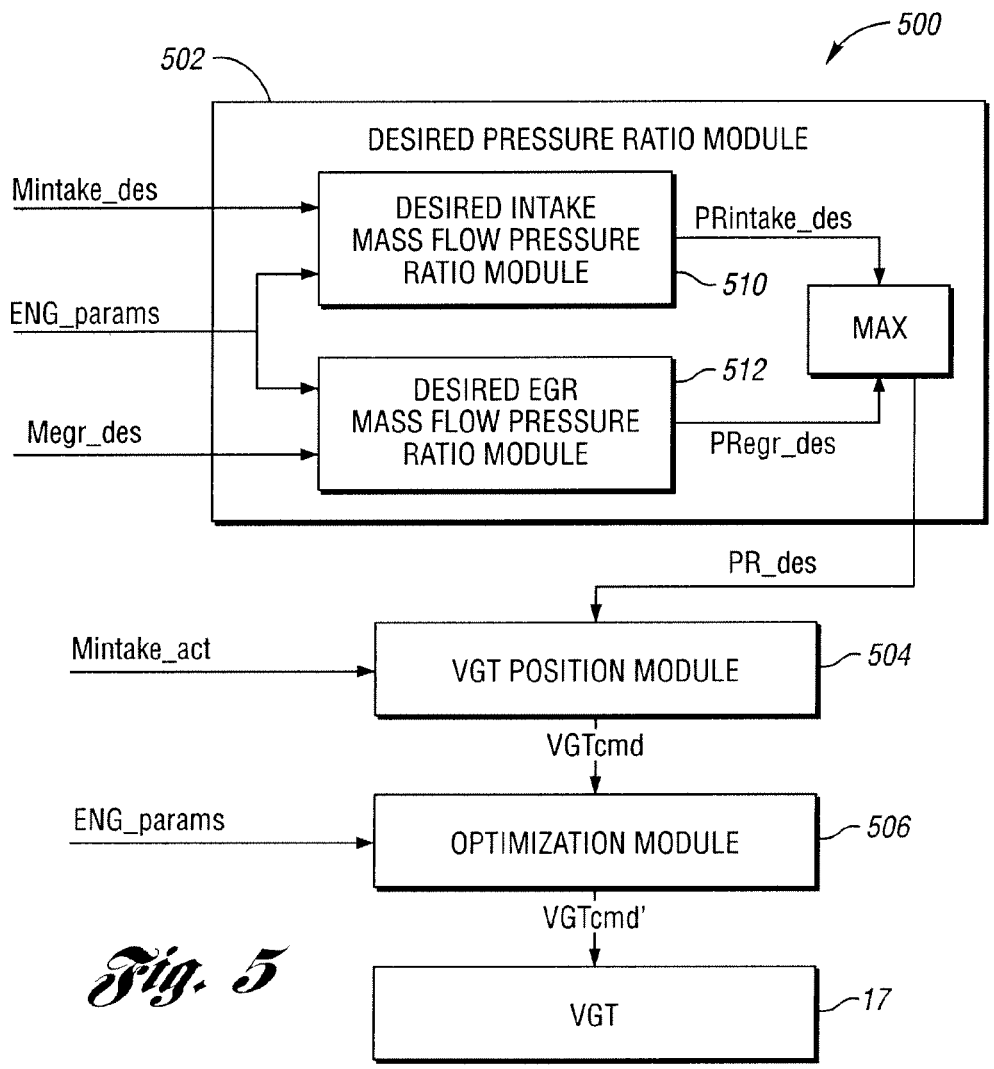
*Fig. 5*

METHOD FOR CONTROLLING AN INTERNAL COMBUSTION ENGINE USING MODEL BASED VGT/EGR CONTROL

STATEMENT REGARDING FEDERALLY SPONSORED RESEARCH OR DEVELOPMENT

The invention was made with Government support under Contract No. DE-FC05-00OR22805. The Government has certain rights to the invention.

BACKGROUND OF THE INVENTION

1. Field of the Invention

The present invention relates to a method for controlling an internal combustion engine using a model based control algorithm, and in particular an internal combustion engine having an exhaust gas recirculation (EGR) and/or a variable geometry turbocharger (VGT) system.

2. Background Art

Internal combustion engines, and in particular, compression ignition (or diesel) engines have a wide variety of applications including passenger vehicles, marine vessels, earth-moving and construction equipment, stationary generators, and on-highway trucks, among others.

Internal combustion engines may include exhaust gas recirculation (EGR) systems and/or variable geometry turbocharger (VGT) systems. Conventional EGR and VGT control systems utilize PID (i.e., proportional, integral, derivative) based closed loop electronic controllers. Such conventional controllers generally perform poorly when the engine is operating under transient conditions (e.g., up and down hills, in response to a varying load, idle to rapid acceleration operation, intermittent workpiece characteristics for power takeoff driven applications, etc.). The poor responsiveness may be attributed to the relative sluggishness of air systems. That is, a modification to a controlled parameter does not generally cause an immediate change in an air system of an internal combustion engine. In the case of a PID based controller, the delay between the modification of the controlled parameter and the detection of a change in the system generally results in oscillation around a desired setpoint. The oscillation may be reduced or eliminated by reducing the responsiveness of the PID algorithm. However, reducing the responsiveness generally provides inadequate performance when the system is operating in a transient state.

Thus, there exists a need and an opportunity for an improved method for EGR and/or VGT control.

SUMMARY OF THE INVENTION

The present invention generally provides, an improved method for EGR and/or VGT control using model based EGR/VGT closed loop control systems. The improved method of the present invention may provide improved EGR and/or VGT control during engine operation, including transient operation. In one embodiment, the present invention may provide for separate control of turbine air mass flow and EGR mass flow. In another embodiment, the present invention may increase the transient state responsiveness of EGR and/or VGT control systems while providing steady state stability. In yet another embodiment, the present invention may reduce oscillation of EGR and/or VGT control systems by reducing control stabilization time. In still yet another embodiment, the present invention may reduce or eliminate reverse EGR flow.

According to the present invention, then, a method is provided for controlling an internal combustion engine wherein the engine includes an exhaust gas recirculation (EGR) valve driven in response to an EGR valve command signal. The method comprises generating a desired EGR valve discharge coefficient based at least in part on a set of engine parameters, generating the EGR valve command signal using the desired EGR valve discharge coefficient and a Discharge Coefficient to EGR Valve Position model, and transmitting the EGR valve command signal to the EGR valve.

Also according to the present invention, a method is provided for controlling an internal combustion engine wherein the engine includes a variable geometry turbocharger (VGT) driven in response to a VGT command signal. The method comprises generating a desired turbine pressure ratio based at least in part on a set of engine parameters, generating the VGT command signal using a VGT position model having a set of inputs, and transmitting the VGT command signal to the VGT. The set of inputs includes the desired turbine pressure ratio and an actual intake mass flow rate.

Still further according to the present invention, a method is provided for controlling an internal combustion engine. The engine includes a variable geometry turbocharger (VGT) driven in response to a VGT command signal and an exhaust gas recirculation (EGR) valve driven in response to an EGR valve command signal to recirculate exhaust to an engine intake manifold. The method comprises determining a set of engine parameters including desired EGR mass flow rate, actual EGR mass flow rate, desired intake mass flow rate, and actual intake mass flow rate. The method further comprises generating a desired EGR valve discharge coefficient and a desired turbine pressure ratio based at least in part on one or more members of the set of engine parameters, generating the EGR valve command signal using the desired EGR valve discharge coefficient and a Discharge Coefficient to EGR Valve Position model, generating the VGT command signal using the desired turbine pressure ratio, the actual intake mass flow rate and a VGT position model, transmitting the EGR valve command signal to the EGR valve, and transmitting the VGT command signal to the VGT.

BRIEF DESCRIPTION OF THE DRAWINGS

FIGS. 4($a$-$b$) are diagrams of simulated comparisons between an engine having a conventional PID based EGR controller and an engine having an EGR controller according to an embodiment of the present invention for a step transient state and a quasi steady state.

FIG. 5 is a schematic diagram of a system for generating a VGT command signal according to at least one embodiment of the present invention;

DETAILED DESCRIPTION

With reference to the Figures, embodiments of the present invention will now be described in detail. The present invention is generally implemented in connection with an internal combustion engine (e.g., a compression ignition or diesel engine) having exhaust gas recirculation (EGR) and/or variable geometry turbocharger (VGT) systems and may provide an improved method for EGR and/or VGT control using model based VGT/EGR closed loop control systems.

In the description below, these variable may be defined as follows:

CONair=Air gas constant

CONegr=EGR model constant

CPair=Air specific heat

DISC_act=Actual EGR valve discharge coefficient

DISC_des=Desired EGR valve discharge coefficient

Eturbo=Turbo power

IMP=Intake manifold pressure

IMT=Intake manifold temperature

Iturb=Turbo shaft moment of inertia

Mair=Air mass flow rate

Megr_act Actual EGR mass flow rate

Megr_des=Desire EGR mass flow rate

Mintake_act=Actual intake mass flow rate

Mintake_des=Desired intake mass flow rate

Ncomp_eff=Compressor efficiency

NT=Turbine efficiency

Pamb=Ambient pressure

Pboost_act Actual engine boost

Pboost_des=Desired engine boost

Pexh_act=Actual exhaust manifold pressure

Pexh_des_egr=Desired exhaust manifold pressure required for desired EGR mass flow rate PR_act=Actual turbine pressure ratio PR_des=Desired turbine pressure ratio PR_engine=Engine pressure ratio (TPI/IMP)

Rair=Air specific heat ratio

Rexh=Exhaust gas specific heat ratio

RPM=Engine speed

RPMturb=Turbo speed

Tamb=Ambient temperature

Texh=Exhaust manifold temperature

TPI=Turbine inlet pressure

Vdisp=Engine displacement volume

Veff=Engine volumetric efficiency

VGTposit=VGT position

Figure 1:
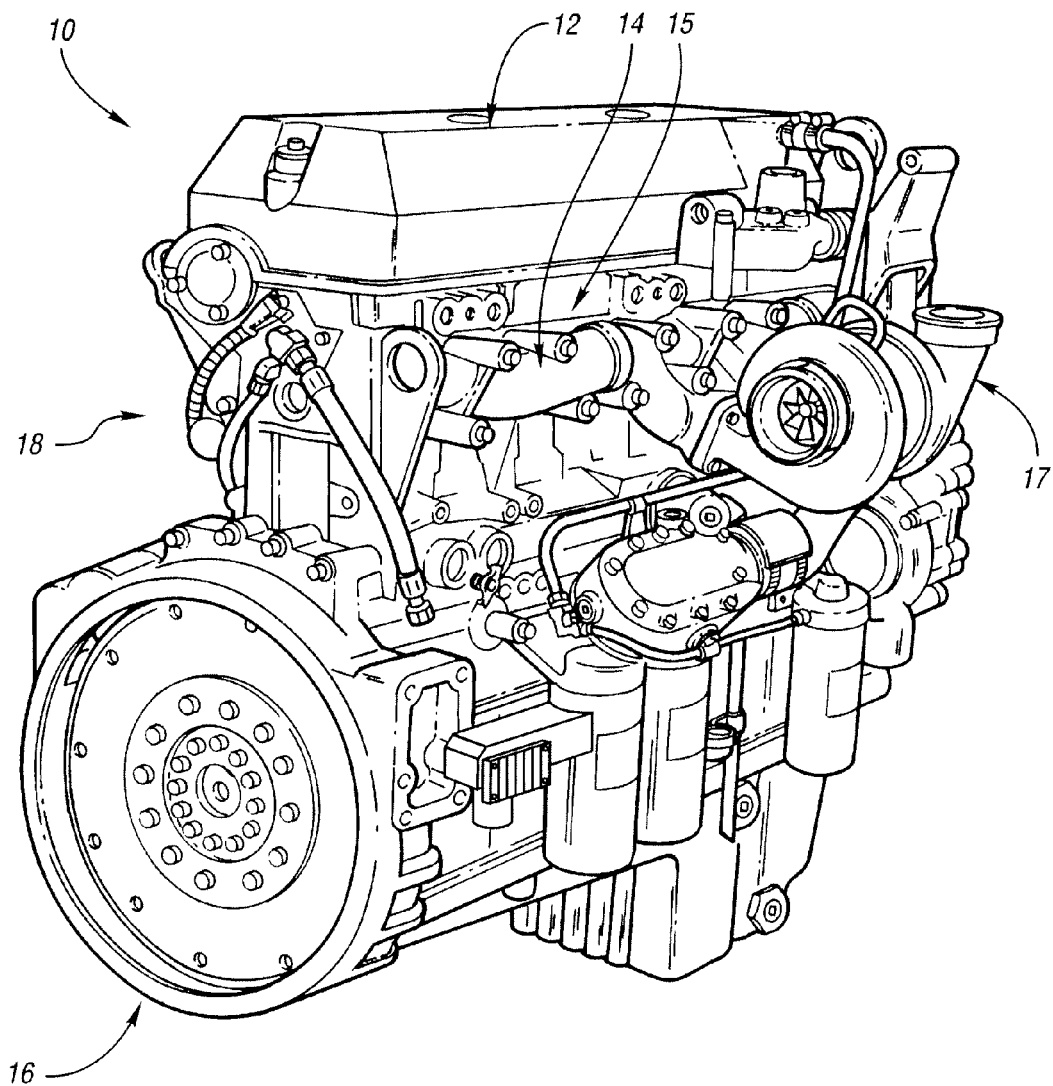
FIG. 1 is a perspective view illustrating a compression-ignition internal combustion engine incorporating various features according to one or more embodiments of the present invention.

Referring to FIG. 1, a perspective view illustrating a compression-ignition internal combustion engine 10 incorporating various features according one or more embodiments of the present invention is shown. The engine 10 may be implemented in a wide variety of applications including on-highway trucks, construction equipment, marine vessels, stationary generators, pumping stations, and the like. The engine 10 generally includes a plurality of cylinders disposed below a corresponding cover, indicated generally by reference numeral 12.

In a preferred embodiment, the engine 10 is a multi-cylinder compression ignition internal combustion engine, such as a 2, 3, 4, 6, 8, 12, 16, or 24 cylinder diesel engine. However, the engine 10 may be implemented having any appropriate number of cylinders 12, the cylinders 12 having any appropriate displacement and compression ratio to meet the design criteria of a particular application. Moreover, the present invention is not limited to a particular type of engine or fuel. The present invention may be implemented in connection with any appropriate engine (e.g., Otto cycle, Rankine cycle, Miller cycle, etc.) using an appropriate fuel to meet the design criteria of a particular application.

The engine 10 generally includes an engine control module (ECM), powertrain control module (PCM), or other appropriate controller 22 (shown and described in detail in connection with FIG. 2). The ECM 22 generally communicates with various engine sensors and actuators via associated interconnection cabling (i.e., leads, wires, connectors, etc.) 18, to control the engine 10. In addition, the ECM 22 may communicate with an engine operator or user (not shown) using associated lights, switches, displays, and the like (not shown).

In one example, the engine 10 may be mounted (i.e., installed, implemented, positioned, disposed, etc.) in a vehicle (not shown). In another example, the engine 10 may be installed in a stationary environment. The engine 10 may be coupled to a transmission (not shown) via flywheel 16. Many transmissions include a power take-off (PTO) configuration where an auxiliary shaft (not shown) may be connected to associated auxiliary equipment (not shown).

The auxiliary equipment may be driven by the engine 10/transmission at a relatively constant rotational speed using an engine variable speed governor (VSG) feature. The auxiliary equipment may include hydraulic pumps for construction equipment, water pumps for fire engines, power generators, and any of a number of other rotationally driven accessories. Typically, when the PTO apparatus is installed on a vehicle, the PTO mode is generally used while the vehicle is stationary. However, the present invention is independent of the particular operation mode of the engine 10, or whether the vehicle is stationary or moving for the applications in which the engine 10 is used in a vehicle having a PTO mode. The loads presented to the engine 10/transmission in a stationary configuration may be relatively constant or may vary.

Figure 2:
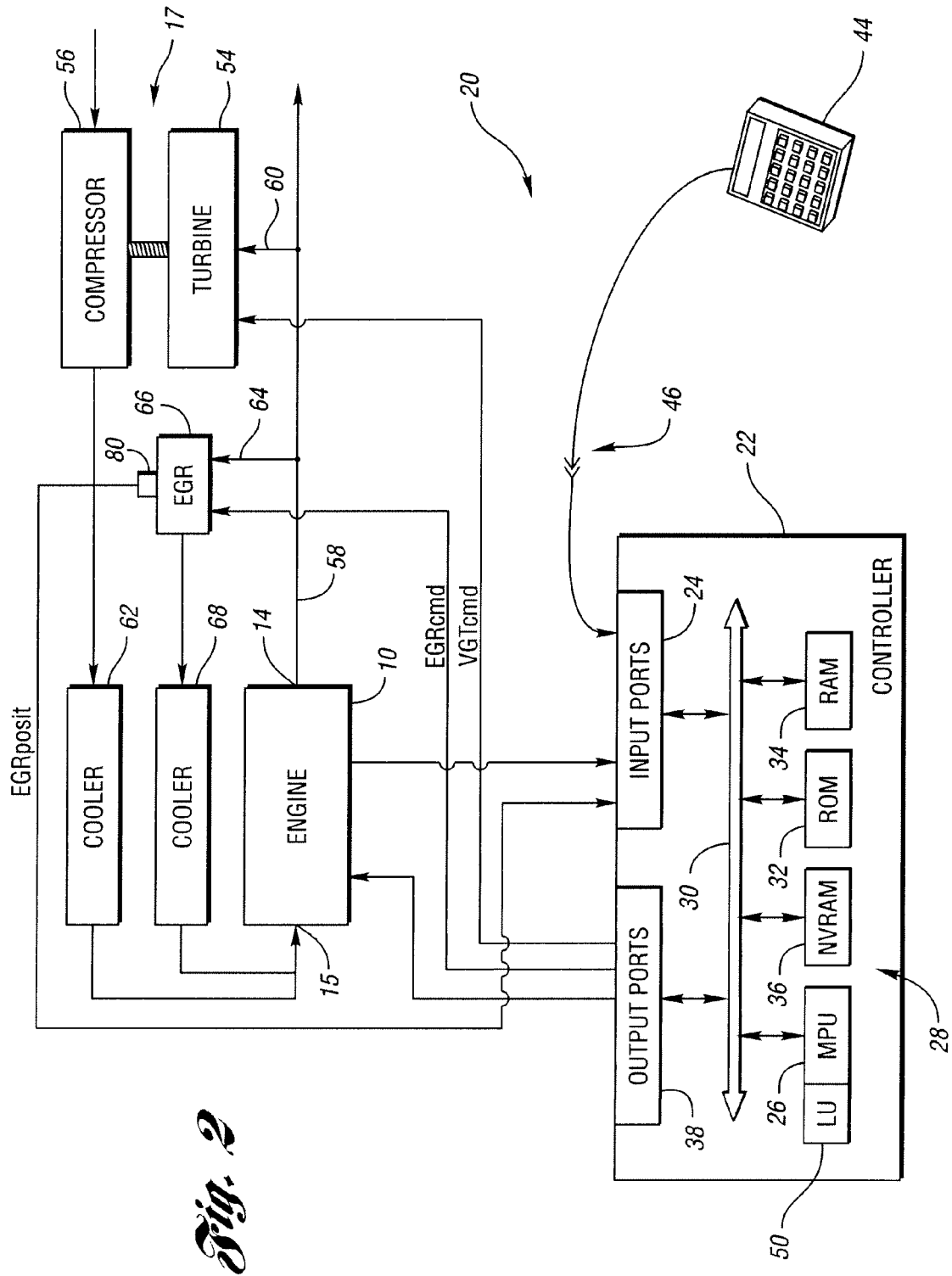
FIG. 2 is a schematic diagram of a system including an engine and associated systems and subsystems according to an embodiment of the present invention.

With reference to FIG. 2, a schematic diagram of a system 20 including an engine 10 and associated systems and subsystems according to an embodiment of the present invention is provided. In at least one embodiment, engine 10 may be a compression-ignition internal combustion engine, such as a heavy duty diesel fuel engine.

Various sensors are in electrical communication with the controller 22 via input ports 24. Controller 22 preferably includes a processor (e.g., microprocessor) 26 in communication with various computer readable storage media 28 via data and control bus 30. Computer readable storage media 28 may include any of a number of known devices such as devices which function as read only memory 32, random access memory 34, non-volatile random access memory 36, and the like. In general, the controller 22 may be a computer or other logical device which executes application programs and/or which performs other logical exercises.

Computer readable storage media 28 may have instructions stored thereon that are executable by controller 22 to perform methods of controlling the internal combustion engine 10, including variable flow exhaust gas recirculation (EGR) valve 66 and variable geometry turbocharger 17. The program instructions may direct controller 22 to control the various systems and subsystems of the vehicle, with the instructions being executed by microprocessor 26, and optionally, instructions may also be executed by any number of logic units 50. Input ports 24 receive signals from various sensors, and controller 22 generates signals at output ports 38 that are directed to the various vehicle components.

A data, diagnostics, and programming interface 44 may also be selectively connected to controller 22 via a plug 46 to exchange various information therebetween. Interface 44 may be used to change values within the computer readable storage media 28, such as configuration settings, calibration variables, instructions for EGR and VGT control and others.

In operation, controller 22 receives signals from the various vehicle sensors and executes control logic embedded in hardware and/or software to control the engine 10. In a preferred embodiment, controller 22 is the DDEC controller available from Detroit Diesel Corporation, Detroit, Mich. However, any appropriate controller 22 may be implemented to meet the design criteria of a particular application.

As is appreciated by one of ordinary skill in the art, control logic may be implemented in hardware, firmware, software, or combinations thereof. Further, control logic may be executed by controller 22 and/or by any of the various systems and subsystems of the vehicle. Further, although in a preferred embodiment controller 22 includes a microprocessor 26, any of a number of known programming and processing techniques or strategy may be used to control an engine 10 in accordance with the present invention.

Further, it is to be appreciated that the engine controller 22 may receive information in a variety of ways. For example, engine systems information may be received over a data link, at a digital input, and/or at a sensor input of the engine controller 22.

With continuing reference to FIG. 2, controller 22 provides enhanced engine performance by controlling a variable flow exhaust gas recirculation valve 66 and/or by controlling a variable geometry turbocharger 17.

The variable geometry turbocharger 17 may include a turbine 54 and a compressor 56 installed in the exhaust gas stream 58 of the engine 10. In general, the pressure of the engine exhaust gasses causes the turbine 54 to spin. The turbine 54 drives the compressor 56, which is typically mounted on the same shaft. The spinning compressor 56 generally provides pressurized air to the intake manifold 15. The pressurized (i.e., boost) air may develop increased power during combustion.

In general, a variable geometry turbocharger 17 has moveable components in addition to the rotor group. These moveable components can change the turbocharger geometry by changing the area or areas in the turbine stage through which exhaust gasses from the engine flow, and/or changing the angle at which the exhaust gasses enter or leave the turbine. Depending upon the turbocharger geometry, the turbocharger 17 supplies varying amounts of turbo boost pressure to the engine. The variable geometry turbocharger 17 may be electronically controlled to vary the amount of turbo boost pressure based on various operating conditions. In at least one embodiment, the geometry of the variable geometry turbocharger 17 may be electronically controlled by controller 22.

In a variable geometry turbocharger 17, the turbine housing is generally oversized for a corresponding engine, and the air flow is generally choked down to the desired level. There are several designs for the variable geometry turbocharger 17. In one design, a variable inlet nozzle has a cascade of moveable vanes which are pivotable to change the area and angle at which the air flow enters the turbine wheel. In another design, the turbocharger 17 has a moveable side wall which varies the effective cross-sectional area of the turbine housing. It is appreciated that embodiments of the present invention are not limited to any particular structure for the variable geometry turbocharger 17.

An exhaust gas recirculation system generally introduces a metered portion of the exhaust gasses into the intake manifold 15. The EGR system may dilute the incoming air charge and lower combustion temperatures to reduce the level of oxides of nitrogen. The amount of exhaust gas to be recirculated is generally controlled by an EGR valve 66 which may be connected between an exhaust manifold 14 and the intake manifold 15. In accordance with the present invention, the EGR valve 66 may be a variable flow valve and may be electronically controlled by controller 22. The EGR valve 66 generally includes an actuator that opens and closes the EGR 66 valve an amount (i.e., level, to a position, etc.) that corresponds to (i.e., in response to) a control signal (e.g., EGRcmd). In one embodiment, a sensor 80 may be coupled to the EGR valve 66 for generating a position signal that corresponds to the position (e.g., amount of opening or closing) of the EGR valve 66.

It is appreciated that there are many possible configurations for a controllable EGR valve 66, and embodiments of the present invention are not limited to any particular structure for the EGR valve. Further, it is appreciated that various sensors at the EGR valve 66 may detect temperature and differential pressure to allow the engine control to determine the mass flow rate through the valve 66. In addition, it is appreciated that various different sensor configurations may be utilized in various parts of the engine 10 to allow controller 22 to determine the various temperatures, pressures, mass flow rates and the like throughout the engine 10, including flow through the EGR system and/or flow through the compressor 56.

In some embodiments, it may be desirable to provide a cooler 62 to cool the charge air coming from compressor 56. Similarly, in some embodiments, it may be desirable to provide a cooler 68 to cool the flow through the EGR system prior to reintroduction to engine 10 of the gasses.

Embodiments of the present invention include control logic that processes various inputs representing various engine parameters, and in turn, provides an EGR valve command signal (e.g., EGRcmd) and/or a VGT command signal (e.g., VGTcmd). The EGR valve command signal generally commands a position for the variable flow EGR valve 66 to control gas flow through path 64, while the VGT command signal generally commands a geometry for VGT 17 to control gas flow through path 60. The various steps and components for generating the EGR valve and VGT command signals may be further illustrated with reference to FIGS. 3-10.

Figure 3:
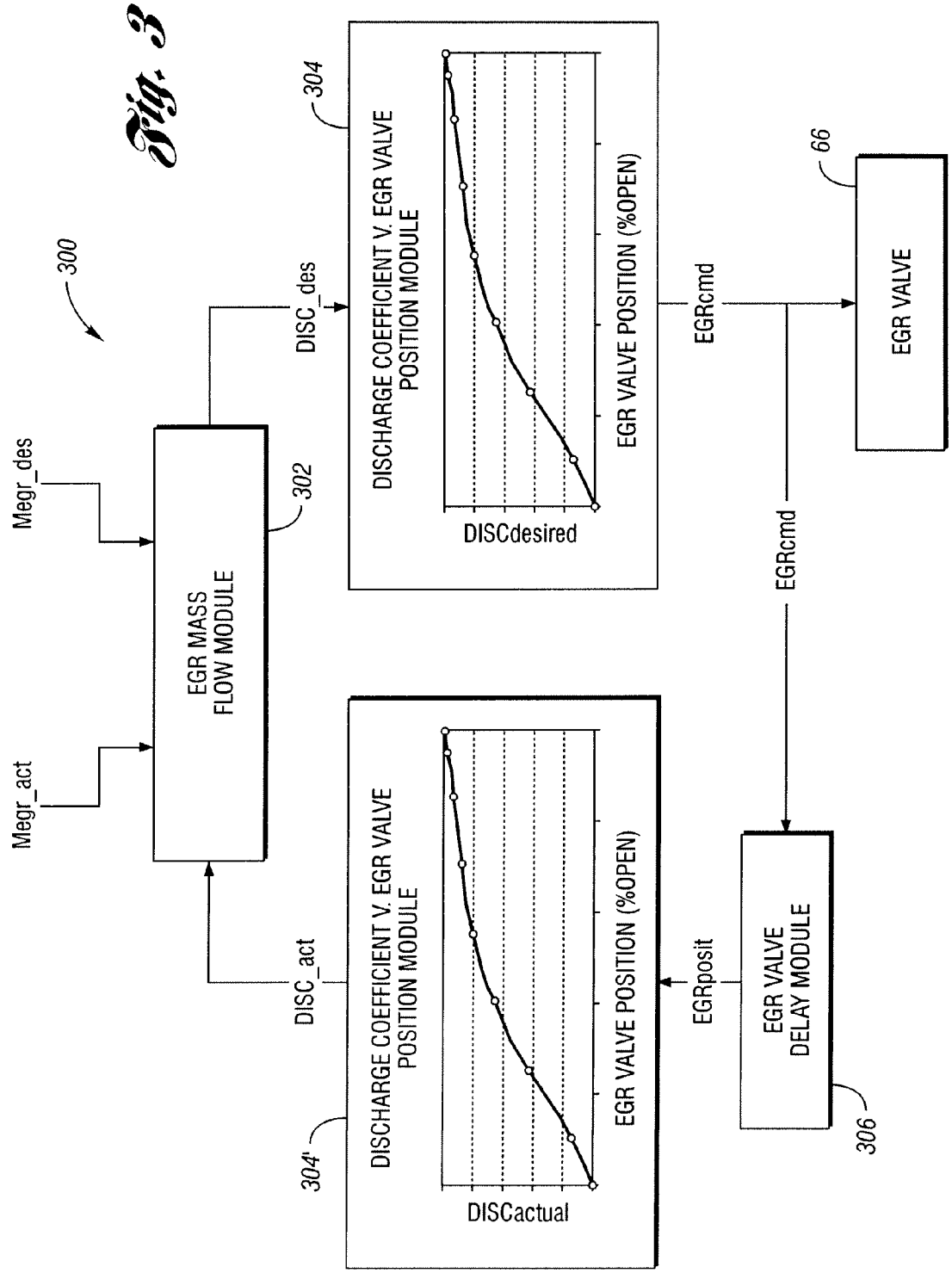
FIG. 3 is a schematic diagram of a system for generating an EGR valve command signal according to at least one embodiment of the present invention.

Referring to FIG. 3, a schematic diagram of a system 300 for generating an EGR valve command signal (i.e., EGR command signal, EGRcmd) according to at least one embodiment of the present invention is shown. The system 300 may be advantageously implemented in connection with the engine 10 as described previously in connection with FIGS. 1 and 2, and/or any appropriate engine to meet the design criteria of a particular application. The system 300 generally includes an EGR Mass Flow module 302, one or more Discharge Coefficient to EGR Valve Position modules 304/304', an EGR Valve Delay module 306 and/or an EGR valve 66.

The EGR Mass Flow module 302 may include one or more inputs for receiving a set of engine parameters, wherein the set of engine parameters may include one or more signals (e.g., electronic signals, impulses, etc.) corresponding to an actual EGR mass flow rate (i.e., Megr_act), a desired EGR mass flow rate (i.e., Megr_des), and/or an actual EGR valve discharge coefficient (i.e., DISC_act). In response to the one or more signals, the EGR Mass Flow module 302 may generate a desired EGR valve discharge coefficient signal (i.e., DISC_des) based at least in part on the set of engine parameters. In at least one embodiment, DISC_des may be generated using the following equation, hereinafter "eq. (1)":

$$DISC\_des = DISC\_act + \left[\frac{DISC\_act}{Megr\_act}\right][Megr\_des - Megr\_act]$$

The use of eq. (1) may be particularly advantageous in a system wherein inputs corresponding to turbine temperature, turbine inlet pressure and/or engine backpressure are not available. However, DISC_des may be generated using any appropriate mechanism to meet the design criteria of a particular application. The EGR Mass Flow module 302 generally presents (i.e., outputs, transmits, etc.) the signal DISC_des to the Discharge Coefficient to EGR Valve Position module 304 via an output.

The Discharge Coefficient to (i.e. versus) EGR Valve Position module 304 generally receives the signal DISC_des and generates an EGR valve command signal (i.e., EGRcmd) based at least in part on the signal DISC_des. In general, the signal EGRcmd may be any appropriate type of signal, such as a pulse width modulated (i.e., PWM) signal. In one embodiment, the EGR Valve Position module 304 generates the signal EGRcmd from the signal DISC_des using the curve shown in element 304 of FIG. 3. However, any appropriate table of values (i.e. lookup table), curve, algorithm and/or mathematical model may be implemented to meet the design criteria of a particular application. The module 304 generally presents the signal EGRcmd to the EGR valve 66 and/or the EGR Valve Delay module 306.

The EGR Valve Delay module 306 generally receives the signal EGRcmd and determines the position of the EGR valve 66 (i.e., EGRposit) based at least in part on the signal EGRcmd. In general, the position of the EGR valve 66 corresponds to the signal EGRcmd at a prior point in time which may be denoted as t-t_lag, wherein t represent the present point in time and t_lag represents actuation lag time. The module 306 generally presents the signal EGRposit to the Discharge Coefficient to EGR Valve Position module 304'.

The Discharge Coefficient to (i.e. versus) EGR Valve Position module 304' generally receives the signal EGRposit and generates an actual EGR valve discharge coefficient signal (i.e., DISC_act) based at least in part on the signal EGRposit. In one embodiment, the EGR Valve Position module 304' is identical to the module 304 and/or generates the signal DISC_act from the signal EGRposit using the curve shown in elements 304 and 304' of FIG. 3. However, any appropriate table of values, curve, algorithm and/or mathematical model may be implemented to meet the design criteria of a particular application. The module 304' generally presents the signal DISC_act to the EGR Mass Flow module 302. Accordingly, the system 300 generally represents a closed loop control system.

In at least one embodiment, the signal EGRposit may be generated by a position sensor 80 coupled to the EGR valve 66. In such an embodiment, the EGR Valve Delay module 306 may be omitted from the system 300.

It is contemplated that control of the functionality of the modules 302, 304, 304', and 306 of the system 300 may be incorporated into a single controller or other logical device, such as is shown in FIG. 2. Alternatively, control of the functionality may be distributed among a plurality of controllers and/or other logical devices. In general, inputs and outputs may be received and passed between controllers and/or other logical devices via a network, dedicated communication wires, and/or the like.

Referring to FIGS. 4(a-b), diagrams of simulated comparisons between an engine having a conventional PID based EGR controller and an engine having an EGR controller according to an embodiment of the present invention are provided for a step transient state (FIG. 4a) and a quasi steady state (FIG. 4b). As illustrated, the present invention generally increases transient state responsiveness and/or reduces control oscillation.

Referring to FIG. 5, a schematic diagram of a system 500 for generating a VGT command signal (i.e., VGTcmd) according to at least one embodiment of the present invention is shown. The system 400 may be advantageously implemented in connection with the engine 10 as described previously in connection with FIGS. 1 and 2, and/or any appropriate engine to meet the design criteria of a particular application. The system generally includes a Desired Pressure Ratio module 502, a VGT Position module 504, an Optimization module 506, and/or a VGT 17.

The Desired Pressure Ratio module 502 generally receives a set of engine parameters which may include one or more signals (e.g., electronic signals, impulses, etc.) corresponding to a desired intake mass flow rate (i.e., Mintake_des), a desired EGR mass flow rate (i.e., Megr_des), and/or the like (e.g., ENG_params). In general, the module 502 generates a desired turbine pressure ratio signal (i.e., PR_des) in response to the one or more signals. The module 502 generally presents the signal PR_des to the VGT Position module 504.

As illustrated, the Desired Pressure Ratio module 502 may further comprise a Desired Intake Mass Flow Pressure Ratio module 510, a Desired EGR Mass Flow Pressure Ratio Module 512, and/or a max comparator 514. In at least one embodiment, the module 502 uses sub-modules 510 and 512 to determine a first turbine pressure ratio (i.e., PRintake_des) corresponding to the desired intake mass flow rate and a second turbine pressure ratio (i.e., PRegr_des) corresponding to the desired EGR mass flow rate, respectively.

In general, the first turbine pressure ratio PRintake_des may be determined using the following instantaneous turbine power balance equation, hereinafter "eq. (2)":

$$\frac{\left[\left(\frac{Pboost\_des}{Pamb}\right)^{\left(\frac{Rair-1}{Rair}\right)} - 1\right]}{\left[1 - PR\_des^{\left(\frac{Rexh-1}{Rexh}\right)}\right]} = \frac{\left[\left(\frac{Pboost\_act}{Pamb}\right)^{\left(\frac{Rair-1}{Rair}\right)} - 1 + Xturb\_iner\right]}{\left[1 - PR\_act^{\left(\frac{Rexh-1}{Rexh}\right)}\right]}$$

Where:

$$Xturb\_iner = \left(\frac{Iturb * RPMturb * Ncomp\_eff}{CPair * Mair * Tamb}\right)\left(\frac{dRPMturb}{dt}\right)$$

$$Pboost\_des = \left(\frac{120 * CONair * IMT}{Veff * Vdisp * RPM}\right) Mintake\_des$$

Similarly, the second turbine pressure ratio PRegr_des may be determined using the following EGR mass flow rate equation, hereinafter "eq.(3)":

$$Pexh\_des\_egr = Pexh\_act + CONegr\left(\frac{Texh}{Pexh\_act}\right)\left[Megr\_des^2 - \left(\frac{Megr\_act^2}{DISC\_act^2}\right)\right]$$

In an embodiment having sub-modules 510 and 512, the module 502 may use the comparator 514 to set PR_des equal to the greater of PRintake_des and PRegr_des. Setting PR_des equal to the greater of PRintake_des and PRegr_des may reduce or eliminate reverse EGR flow.

The VGT Position module 504 generally receives a set of inputs which may include the signal PR_des and/or an actual intake mass flow rate (i.e., Mintake_act). The module 504 may generate a VGT command signal (i.e., VGTcmd) using PR_des, Mintake_act, and a VGT position model. In one embodiment, the VGT position model may comprise the curve shown in FIG. 6. However, any appropriate table of values (i.e., lookup table), curve, algorithm, and/or mathematical model may be implemented to meet the design criteria of a particular application. The module 504 may present the signal VGTcmd to the Optimization module 506.

The Optimization module 506 generally receives the signal VGTcmd and determines when the VGTcmd violates an intake mass flow criterion and/or a turbine power criterion. In at least one embodiment, the intake mass flow criterion comprises the following equations, hereinafter eqs. (4) and (5) respectively:

$$\left[\frac{\Delta Mintake\_act}{\Delta VGTposit}\right] > 0$$

$$Veff + \frac{dVeff}{dPR\_engine}\left[\frac{\left(\frac{\Delta TPI}{\Delta VGTposit}\right)}{\left(\frac{\Delta IMP}{\Delta VGTposit}\right)} - PR\_engine\right] > 0$$

Similarly, in at least one embodiment, the turbine power criterion comprises the following equations, hereinafter eqs. (6) and (7) respectively:

$$\left[\frac{\Delta Eturbo}{\Delta VGTposit}\right] > 0$$

$$\left[\frac{\left(\frac{Rexh-1}{Rexh}\right)}{PR\_act^{\frac{Rexh-1}{Rexh}} - 1}\right] + \left[\frac{PR\_act\, \partial NT}{NT\, \partial PR\_act}\right] + \left[\frac{PR\_act\, \partial NT\, \partial VGTposit}{NT\, \partial VGTposit\, \partial}\right] > 0$$

The module 506 generally modifies the VGT command signal VGTcmd to increase intake mass flow when VGTcmd violates (i.e., is not consistent with, does not conform to, etc.) the intake mass flow criterion and/or the turbine power criterion (e.g., eq. 4, 5, 6, or 7 is violated). The module 506 generally presents the signal VGTcmd or the modified signal VGTcmd' to the VGT 17.

It is contemplated that control of the functionality of the modules 502, 504, 506, 510, 512 and 514 of the system 500 may be incorporated into a single controller or other logical device, such as is shown in FIG. 2. Alternatively, control of the functionality may be distributed among a plurality of controllers and/or other logical devices. In general, inputs and outputs may be received and passed between controllers and/or other logical devices via a network, dedicated communication wires, and/or the like.

Figure 6:
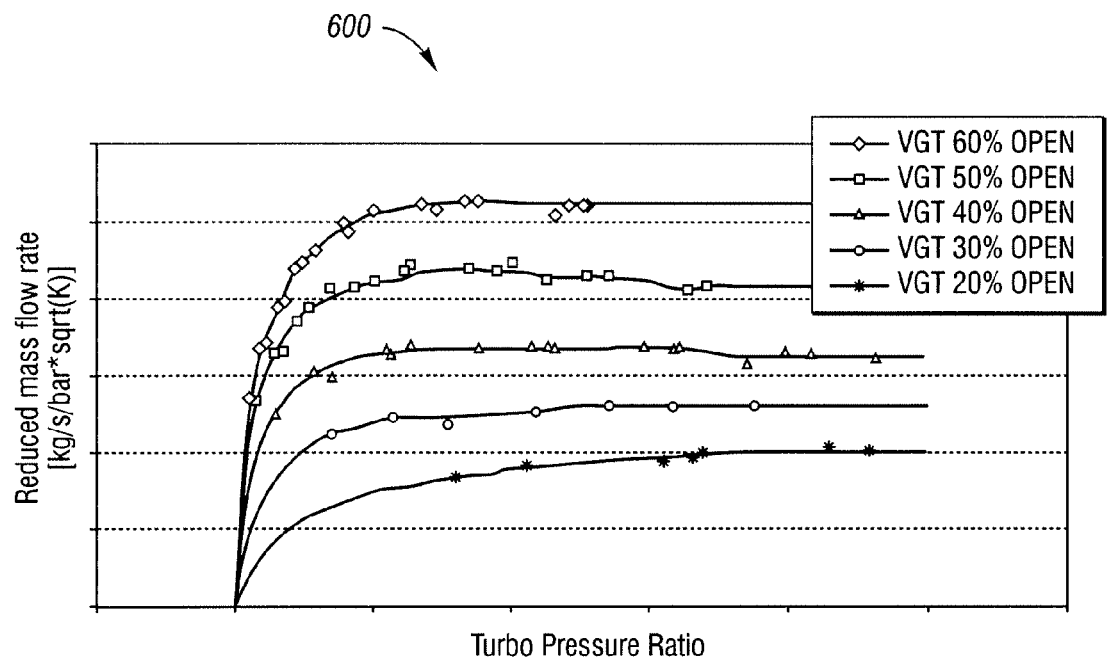
FIG. 6 is a turbine mass flow map for a heavy duty engine.

Referring to FIG. 6, a turbine mass flow map 600 for a heavy duty engine is provided. In at least one embodiment, the three dimensional (i.e., including three variables) turbine mass flow map 600 may be implemented as a VGT position model.

Figure 7:
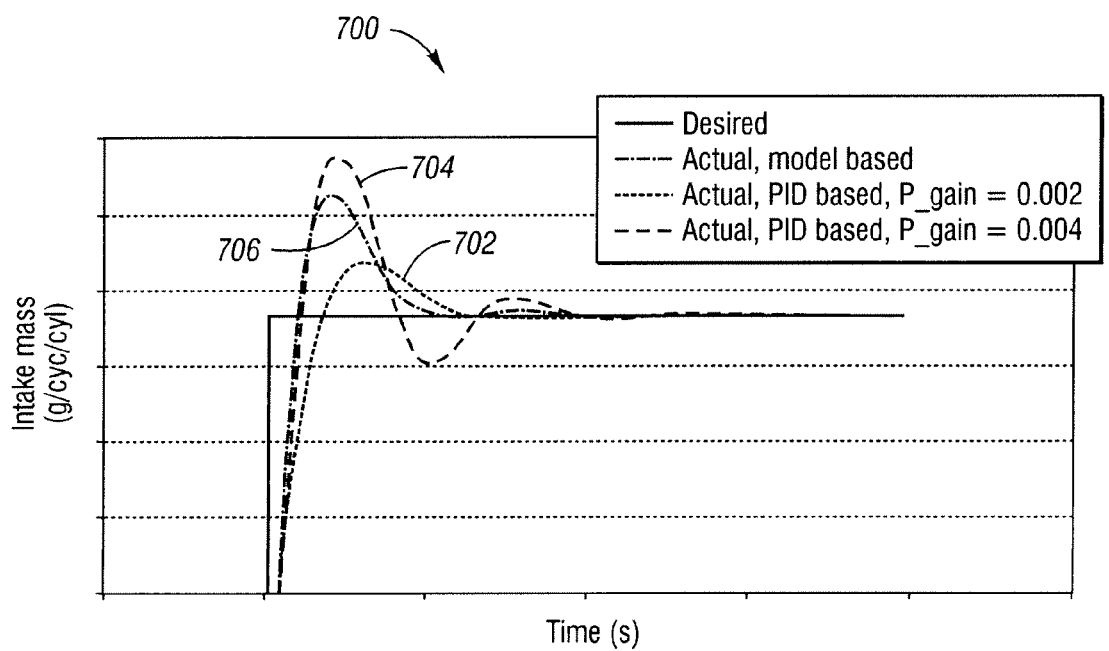
FIG. 7 is a diagram of a simulated comparison between an engine having a conventional PID based VGT controller and an engine having an VGT controller according to an embodiment of the present invention for a step transient state.

Referring to FIG. 7, a diagram 700 of a simulated comparison between an engine having a conventional PID based VGT controller (e.g., curves 702 and 704) and an engine having an VGT controller according to an embodiment of the present invention (e.g., curve 706) is provided for a step transient state. As illustrated, the present invention generally increases transient state responsiveness and/or reduces control oscillation.

Figure 8:
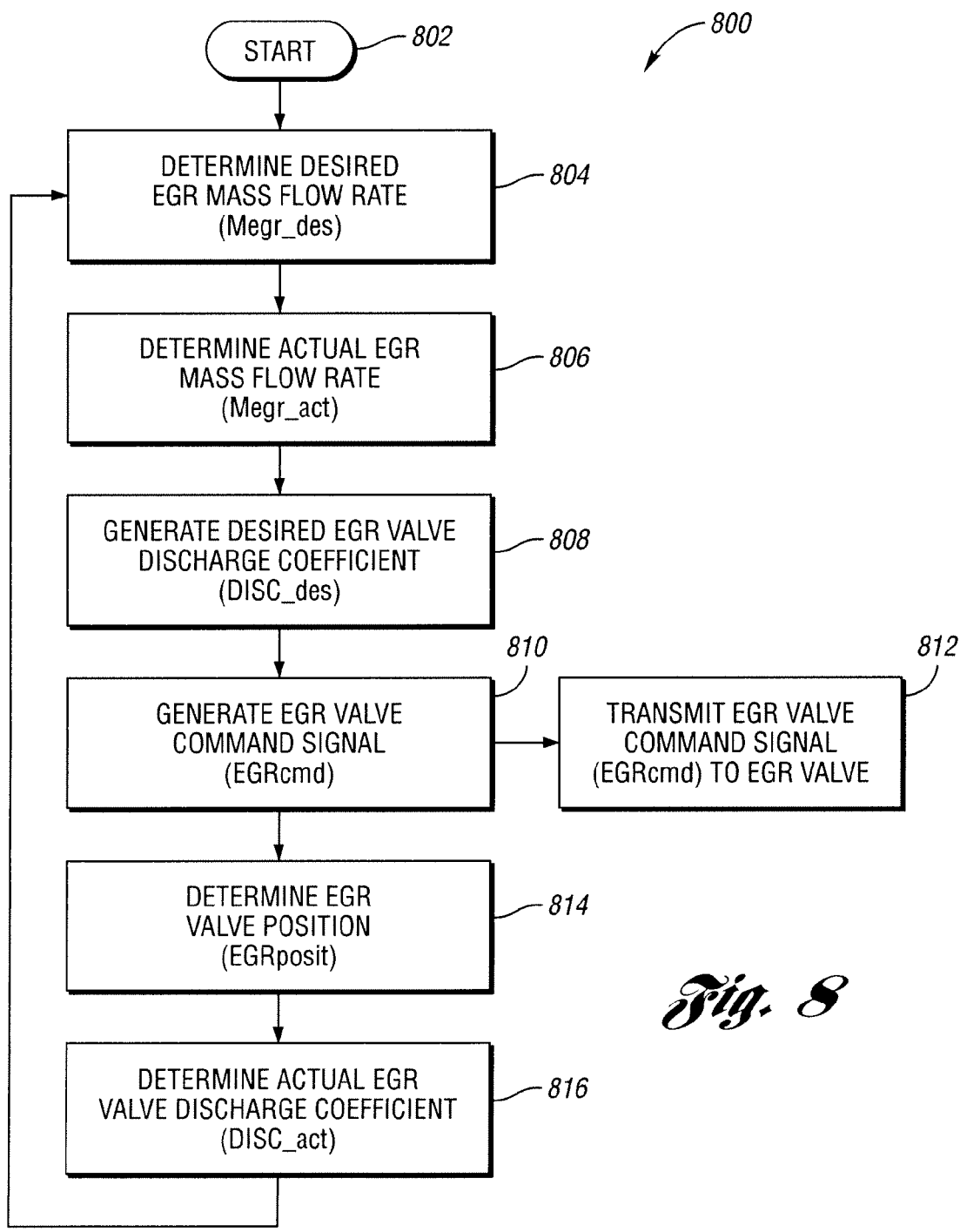
FIG. 8 is a flow diagram of a method for controlling an internal combustion engine having an exhaust gas recirculation valve driven in response to an EGR valve command signal according to an embodiment of the present invention.

Referring to FIG. 8, a flow diagram of a method 800 for controlling an internal combustion engine having an exhaust gas recirculation valve driven in response to an EGR valve command signal according to an embodiment of the present invention is shown. The method 800 may be advantageously implemented in connection with the engine 10, described previously in connection with FIGS. 1 and 2, and/or any appropriate system (e.g., the system 300 described previously in connection with FIG. 3) or other method to meet the design criteria of a particular application. In particular the method 800 is generally performed by a logical device, such as the controller 22. The method 800 generally includes a plurality of blocks or steps that may be performed serially. As will be appreciated by one of ordinary skill in the art, the order of the blocks/steps shown in FIG. 8 are exemplary and the order of one or more block/step may be modified within the spirit and scope of the present invention. Additionally, the blocks/steps of the method 800 may be performed in at least one non-serial (or non-sequential) order, and one or more blocks/steps may be omitted to meet the design criteria of a particular application. Similarly, two or more of the blocks/steps of the method 800 may be performed in parallel. Step 802 generally represents an entry point into the method 800.

At step 804, a desired EGR mass flow rate (e.g., Megr_des) may be determined. In general, the desired EGR mass flow rate may be determined using any appropriate technique to satisfy the design criteria of a particular application. From step 804, the method 800 generally falls through to step 806.

At step 806, an actual EGR mass flow rate (e.g., Megr_act) may be determined. In general, the actual EGR mass flow rate may be determined using any appropriate technique to satisfy the design criteria of a particular application. From step 806, the method 800 generally falls through to step 808.

At step 808, a desired EGR valve discharge coefficient (e.g., DISC_des) may be generated based at least in part on a set of engine parameters. In at least one embodiment, the set of engine parameters may include an actual EGR valve discharge coefficient as determined in step 816 (described in detail below), the desired EGR mass flow rate, and/or the actual EGR mass flow rate. In at least one embodiment, the desired EGR valve discharge coefficient may be generated using the following mathematical model wherein DISC_des is the desired EGR valve discharge coefficient, DISC_act is the actual EGR valve discharge coefficient, Megr_act is the actual EGR mass flow rate, and Megr_des is the desire EGR mass flow rate:

$$DISC\_des = DISC\_act + \left[\frac{DISC\_act}{Megr\_act}\right][Megr\_des - Megr\_act]$$

From step 808, the method 800 generally falls through to step 810.

At step 810, an EGR valve command signal (e.g., EGRcmd) may be generated using the desired EGR valve discharge coefficient and a Discharge Coefficient to EGR Valve Position model. In general, the Discharge Coefficient to EGR Valve Position model may be any appropriate mechanism for describing a relationship (i.e., correspondence) between a Discharge Coefficient and an EGR Valve Position, such as a lookup table and/or a mathematical algorithm. From step 810, the method 800 generally branches to steps 812 and 814.

At step 812, the EGR valve command signal may be transmitted (i.e., presented, sent, conveyed, etc.) to an EGR valve (e.g., 66).

At step 814, an EGR valve position (e.g., EGRposit) may be determined using any appropriate technique to satisfy the design criteria of a particular application. In at least one embodiment, the EGR valve position may be determined using an EGR valve command signal and an EGR Valve Delay module (e.g. 306). In general, the EGR Valve Delay model may be any appropriate mechanism for describing a relationship (i.e., correspondence) between an EGR valve command signal and a position of the EGR Valve, such as a lookup table and/or a mathematical algorithm. In such an embodiment, the present position of the EGR valve may correspond to the EGR valve command signal at a prior point in time denoted as t-t_lag, wherein t represent the present point in time and t_lag represents EGR valve actuation lag time. In at least one other embodiment, the EGR valve position may be determined using a sensor (e.g., 80) coupled to the EGR valve. From step 814, the method 800 generally falls through to step 816.

At step 816, an actual EGR valve discharge coefficient (e.g., DISC_act) may be determined based at least in part on the EGR valve position and/or an EGR Valve Position to Discharge Coefficient model. In general, the EGR Valve Position to Discharge Coefficient model may be any appropriate mechanism for describing a relationship (i.e., correspondence) between an EGR Valve Position and a Discharge Coefficient, such as a lookup table and/or a mathematical algorithm. In at least one embodiment, the EGR Valve Position to Discharge Coefficient model is identical to the Discharge Coefficient to EGR Valve Position model described previously in connection with step 810. From step 816, the method 800 may terminate or may return to step 804 such that the method 800 is generally iterative.

Figure 9:
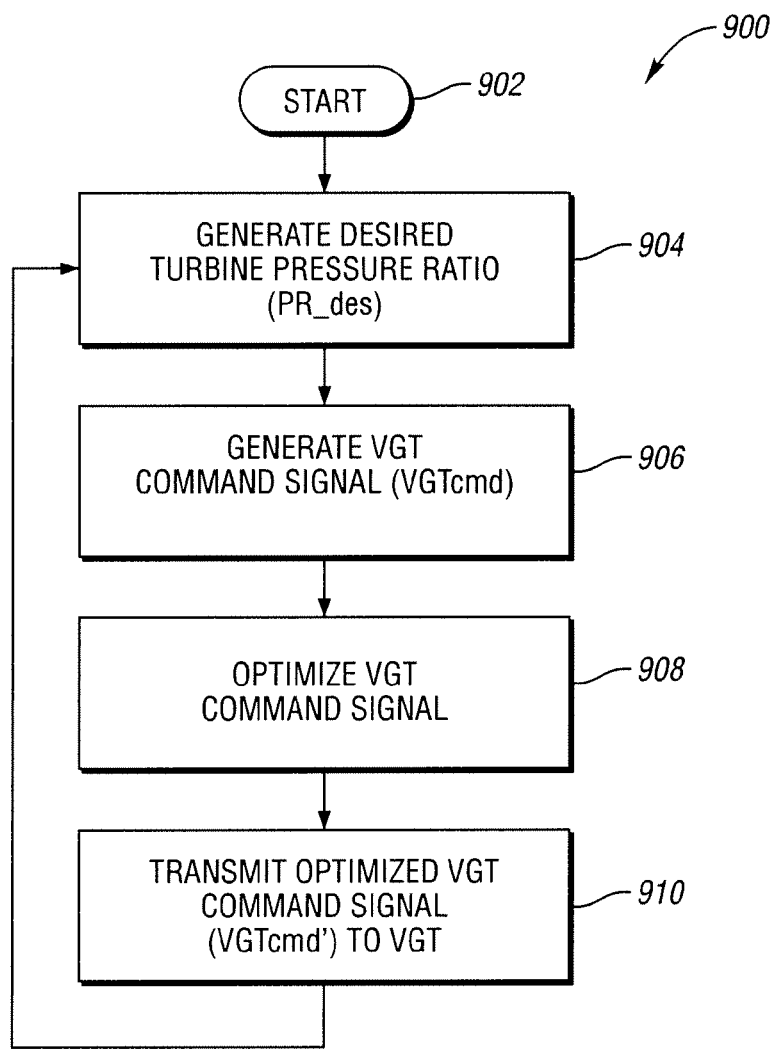
FIG. 9 is a flow diagram of a method for controlling an internal combustion engine having a variable geometry turbocharger driven in response to an VGT command signal according to an embodiment of the present invention.

Referring to FIG. 9, a flow diagram of a method 900 for controlling an internal combustion engine having a variable geometry turbocharger driven in response to an VGT command signal according to an embodiment of the present invention is shown. The method 900 may be advantageously implemented in connection with the engine 10, described previously in connection with FIGS. 1 and 2, and/or any appropriate system (e.g., the system 500 described previously in connection with FIG. 5) or other method (e.g., the method 800 described previously in connection with FIG. 8, the method 950 described in detail in connection with FIG. 10) to meet the design criteria of a particular application. In particular the method 900 is generally performed by a logical device, such as the controller 22. The method 900 generally includes a plurality of blocks or steps that may be performed serially. As will be appreciated by one of ordinary skill in the art, the order of the blocks/steps shown in FIG. 9 are exemplary and the order of one or more block/step may be modified within the spirit and scope of the present invention. Additionally, the blocks/steps of the method 900 may be performed in at least one non-serial (or non-sequential) order, and one or more blocks/steps may be omitted to meet the design criteria of a particular application. Similarly, two or more of the blocks/steps of the method 900 may be performed in parallel. Step 902 generally represents an entry point into the method 900.

At step 904, a desired turbine pressure ratio (e.g., PR_des) may be generated based at least in part on a set of engine parameters (e.g., ENG_params, Mintake_des, Megr_des, and the like). In at least one embodiment, the desired turbine pressure ratio may be determined using the method 950 disclosed in detail in connection with FIG. 10. However, the desired turbine pressure ratio may be determined using any appropriate technique to satisfy the design criteria of a particular application. From step 904, the method 900 generally falls through to step 906.

At step 906, a VGT command signal (e.g., VGTcmd) may be generated. In at least one embodiment, the VGT command signal may be generated using a VGT position model. The VGT position model may have a set of inputs, wherein the set of inputs includes the desired turbine pressure ratio and an actual intake mass flow rate (e.g., Mintake_act). However, the VGT command signal may be generated using any appropriate VGT position model (e.g., a lookup table, a mathematical algorithm, a three dimensional lookup table, and/or the like) to meet the design criteria of a particular application. From step 906, the method 900 generally falls through to step 908.

At step 908, the VGT command signal may be optimized (i.e., modified, altered, etc.) prior to transmitting the VGT command signal to the VGT (e.g., 17). Optimizing the VGT command signal generally comprises determining when the VGT command signal violates an intake mass flow criterion and/or a turbine power criterion. In at least one embodiment, eqs. (4) and (5), described previously, may be implemented as the intake mass flow criterion. In at least one other embodiment, eqs. (6) and (7), described previously, may be implemented as the turbine power criterion. However, any appropriate intake mass flow criterion and/or a turbine power criterion may be implemented to satisfy the design criteria of a particular application. The VGT command signal is generally modified to increase intake mass flow when the VGT command signal violates (i.e., is not consistent with, does not conform to, etc.) the intake mass flow criterion and/or the turbine power criterion. From step 908, the method 900 generally falls through to step 910.

At step 910, the VGT command signal (i.e., VGTcmd) or modified VGT command signal (i.e., VGTcmd') may be transmitted (i.e., presented, sent, conveyed, etc.) to a VGT (e.g., 17). From step 910, the method 900 may terminate or may return to step 904 such that the method 900 is generally iterative.

Figure 10:
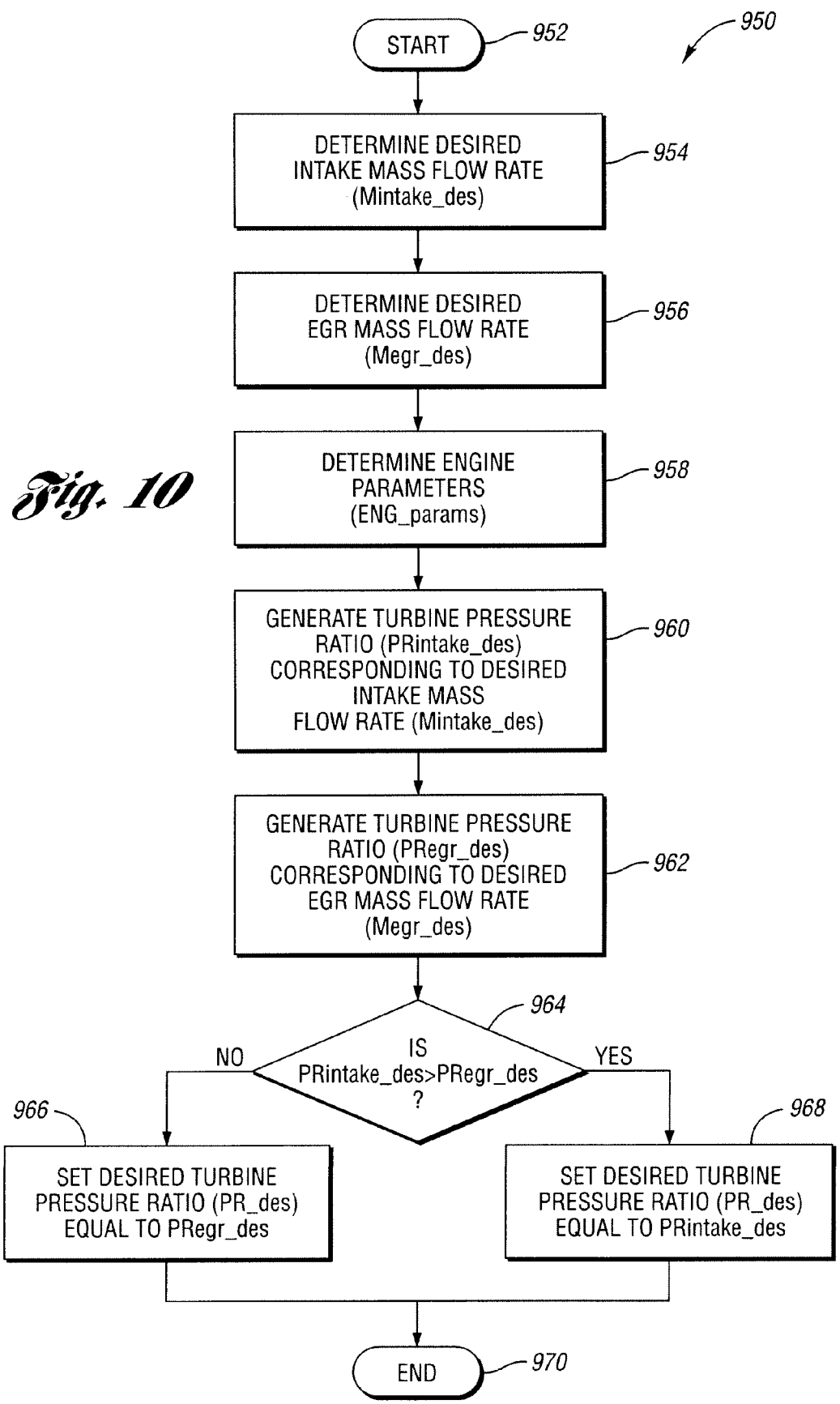
FIG. 10 is a flow diagram of a method for generating a desired turbine pressure ratio according to an embodiment of the present invention.

Referring to FIG. 10, a flow diagram of a method 950 for generating a desired turbine pressure ratio (e.g., PR_des) according to an embodiment of the present invention is shown. The method 950 may be advantageously implemented in connection with the engine 10, described previously in connection with FIGS. 1 and 2, and/or any appropriate system (e.g., the system 500 described previously in connection with FIG. 5) or other method (e.g., the method 800 described previously in connection with FIG. 8, the method 900 described previously in connection with FIG. 9) to meet the design criteria of a particular application. In particular the method 950 is generally performed by a logical device, such as the controller 22. The method 950 generally includes a plurality of blocks or steps that may be performed serially. As will be appreciated by one of ordinary skill in the art, the order of the blocks/steps shown in FIG. 10 are exemplary and the order of one or more block/step may be modified within the spirit and scope of the present invention. Additionally, the blocks/steps of the method 950 may be performed in at least one non-serial (or non-sequential) order, and one or more blocks/steps may be omitted to meet the design criteria of a particular application. Similarly, two or more of the blocks/steps of the method 950 may be performed in parallel. Step 952 generally represents an entry point into the method 950.

At step 954, a desired intake mass flow rate (e.g., Mintake_des) may be determined. In general, the desired intake mass flow rate may be determined using any appropriate technique to satisfy the design criteria of a particular application. From step 954, the method 950 generally falls through to step 956.

At step 956, a desired EGR mass flow rate (e.g., Megr_des) may be determined. In general, the desired EGR mass flow rate may be determined using any appropriate technique to satisfy the design criteria of a particular application. From step 956, the method 950 generally falls through to step 958.

At step 958, any of a number of additional engine parameters (ENG_params) may be determined using any appropriate technique to satisfy the design criteria of a particular application. From step 958, the method 950 generally falls through to step 960.

At step 960, a first turbine pressure ratio (e.g., PRintake_des) corresponding to the desired intake mass flow rate may be generated. In general, the first turbine pressure ratio may be determined using any appropriate technique to satisfy the design criteria of a particular application. From step 960, the method 950 generally falls through to step 962.

At step 962, a second turbine pressure ratio (e.g., PRegr_des) corresponding to the desired EGR mass flow rate may be generated. In general, the second turbine pressure ratio may be determined using any appropriate technique to satisfy the design criteria of a particular application. From step 962, the method 950 generally falls through to decision block 964.

At decision block 964, a comparator (e.g., 514) may determine the relative relationship between the first and second turbine pressure ratios. The desired turbine pressure ratio is generally set equal to the greater of the first and second turbine pressure ratios, as is exemplified by blocks 966 and 968. In at least one embodiment, setting the desired turbine pressure ratio equal to the greater of the first and second turbine pressure ratios may reduce and/or eliminate reverse EGR flow.

Step 970 generally represents an exit point out of the method 950. In at least one embodiment, step 970 may represent and entry into the method 900 (e.g., step 902).

In accordance with various embodiments of the present invention, the methods described herein may be implemented as programs running on a processor, such as a computer processor. Dedicated hardware implementations including, but not limited to, application specific integrated circuits, programmable logic arrays and other hardware devices can likewise be constructed to implement the methods described herein.

It should also be noted that the program implementations of the present invention as described herein are optionally stored on a tangible storage medium, such as a magnetic medium, a magneto-optical or optical medium, or a solid state medium. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the program implementations herein are stored.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling an internal combustion engine, the engine including an exhaust gas recirculation (EGR) valve driven in response to an EGR valve command signal, the method comprising:
   generating a desired EGR valve discharge coefficient based at least in part on a set of engine parameters;
   generating the EGR valve command signal using the desired EGR valve discharge coefficient and a Discharge Coefficient to EGR Valve Position model; and
   transmitting the EGR valve command signal to the EGR valve.

2. The method of claim 1 further comprising:
   determining a desired EGR mass flow rate; and
   determining an actual EGR mass flow rate,
   wherein the set of engine parameters includes the desired EGR mass flow rate and the actual EGR mass flow rate.

3. The method of claim 1 further comprising:
   determining EGR valve position; and
   determining actual EGR valve discharge coefficient based at least in part on the EGR valve position,
   wherein the set of engine parameters includes the actual EGR valve discharge coefficient.

4. The method of claim 3 wherein the actual EGR valve discharge coefficient is determined using the EGR valve position and an EGR Valve Position to Discharge Coefficient model comprising a lookup table.

5. The method of claim 3 wherein the actual EGR valve discharge coefficient is determined using the EGR valve position and an EGR Valve Position to Discharge Coefficient model comprising a mathematical algorithm.

6. The method of claim 3 wherein the EGR valve position is determined using a sensor coupled to the EGR valve.

7. The method of claim 3 wherein the EGR valve position is determined using the EGR valve command signal and an EGR valve delay model.

8. The method of claim 1 wherein the Discharge Coefficient to EGR Valve Position model comprises a lookup table.

9. The method of claim 1 wherein the Discharge Coefficient to EGR Valve Position model comprises a mathematical algorithm.

10. The method of claim 1 wherein the desired EGR valve discharge coefficient is generated using $$DISC\_des = DISC\_act + \left[\frac{DISC\_act}{Megr\_act}\right][Megr\_des - Megr\_act]$$

wherein DISC_des is the desired EGR valve discharge coefficient, DISC_act is an actual EGR valve discharge coefficient, Megr_act is an actual EGR mass flow rate, and Megr_des is a desired EGR mass flow rate.

11. A method for controlling an internal combustion engine, the engine including a variable geometry turbocharger (VGT) driven in response to a VGT command signal, the method comprising:
    generating a desired turbine pressure ratio based at least in part on a set of engine parameters;
    generating the VGT command signal using a VGT position model having a set of inputs, wherein the set of inputs includes the desired turbine pressure ratio and an actual intake mass flow rate; and
    transmitting the VGT command signal to the VGT.

12. The method of claim 11 wherein generating the desired turbine pressure ratio comprises:
    generating a first turbine pressure ratio corresponding to a desired intake mass flow rate;
    generating a second turbine pressure ratio corresponding to a desired EGR mass flow rate; and
    setting the desired turbine pressure ratio equal to the greater of the first and second turbine pressure ratios.

13. The method of claim 11 further comprising optimizing the VGT command signal prior to transmitting the VGT command signal to the VGT.

14. The method of claim 13 wherein optimizing the VGT command signal further comprises:
    determining when the VGT command signal violates at least one of an intake mass flow criterion and a turbine power criterion; and
    modifying the VGT command signal to increase intake mass flow when the VGT command signal violates at least one of the intake mass flow criterion and the turbine power criterion.

15. The method of claim 11 wherein the VGT position model comprises at least one of a lookup table and a mathematical algorithm.

16. The method of claim 11 wherein the VGT position model comprises a three dimensional lookup table.

17. A method for controlling an internal combustion engine, the engine including a variable geometry turbocharger (VGT) driven in response to a VGT command signal, the engine further including an exhaust gas recirculation (EGR) valve driven in response to an EGR valve command signal to recirculate exhaust to an engine intake manifold, the method comprising:
    determining a set of engine parameters including desired EGR mass flow rate, actual EGR mass flow rate, desired intake mass flow rate, and actual intake mass flow rate;
    generating a desired EGR valve discharge coefficient and a desired turbine pressure ratio based at least in part on one or more members of the set of engine parameters;
    generating the EGR valve command signal using the desired EGR valve discharge coefficient and a Discharge Coefficient to EGR Valve Position model;
    generating the VGT command signal using the desired turbine pressure ratio, the actual intake mass flow rate and a VGT position model;
    transmitting the EGR valve command signal to the EGR valve; and
    transmitting the VGT command signal to the VGT.

18. The method of claim 17 wherein the Discharge Coefficient to EGR Valve Position model comprises a lookup table.

19. The method of claim 17 wherein the Discharge Coefficient to EGR Valve Position model comprises a mathematical algorithm.

20. The method of claim 17 wherein the desired EGR valve discharge coefficient is generated using $$DISC\_des = DISC\_act + \left[\frac{DISC\_act}{Megr\_act}\right][Megr\_des - Megr\_act]$$

wherein DISC_des is the desired EGR valve discharge coefficient, DISC_act is an actual EGR valve discharge coefficient, Megr_act is the actual EGR mass flow rate, and Megr_des is the desired EGR mass flow rate.

* * * * *